(12) United States Patent
Hamaguchi

(10) Patent No.: US 11,661,004 B2
(45) Date of Patent: May 30, 2023

(54) VEHICLE IMAGE PROCESSING DEVICE

(71) Applicant: ALPINE ELECTRONICS, INC., Tokyo (JP)

(72) Inventor: Tomoya Hamaguchi, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 187 days.

(21) Appl. No.: 17/171,130

(22) Filed: Feb. 9, 2021

(65) Prior Publication Data
US 2021/0291853 A1 Sep. 23, 2021

(30) Foreign Application Priority Data

Mar. 20, 2020 (JP) .............................. JP2020-050335

(51) Int. Cl.
*B60R 1/00* (2022.01)
*B60W 50/14* (2020.01)
*G06V 20/56* (2022.01)

(52) U.S. Cl.
CPC .............. *B60R 1/00* (2013.01); *B60W 50/14* (2013.01); *G06V 20/56* (2022.01); *B60R 2300/30* (2013.01); *B60R 2300/304* (2013.01); *B60R 2300/306* (2013.01); *B60R 2300/307* (2013.01); *B60R 2300/308* (2013.01); *B60R 2300/60* (2013.01); *B60R 2300/602* (2013.01); *B60R 2300/605* (2013.01); *B60R 2300/70* (2013.01); *B60R 2300/80* (2013.01); *B60W 2050/146* (2013.01); *B60W 2420/403* (2013.01)

(58) Field of Classification Search
None
See application file for complete search history.

(56) References Cited

U.S. PATENT DOCUMENTS

| | | | | |
|---|---|---|---|---|
| 8,441,435 | B2 * | 5/2013 | Kondo | G02B 27/0093 |
| | | | | 345/156 |
| 9,280,202 | B2 * | 3/2016 | Gieseke | G06V 20/597 |
| 9,317,759 | B2 * | 4/2016 | Inada | G06F 3/012 |
| 9,405,982 | B2 * | 8/2016 | Zhang | G06V 40/18 |
| 9,738,224 | B2 * | 8/2017 | Gieseke | G06F 3/012 |
| 10,616,488 | B2 * | 4/2020 | Li | B60R 11/0235 |
| 10,875,453 | B2 * | 12/2020 | Gieseke | G06V 20/597 |

(Continued)

FOREIGN PATENT DOCUMENTS

| | | | | |
|---|---|---|---|---|
| CN | 108701415 A | * | 10/2018 | ............... B60R 1/00 |
| CN | 113497875 A | * | 10/2021 | ............... B60R 1/00 |

(Continued)

OTHER PUBLICATIONS

Extended European Search Report for 21160294.1 dated Apr. 7, 2021, 7 pgs.

*Primary Examiner* — Kevin R Steckbauer
(74) *Attorney, Agent, or Firm* — Crowell & Moring LLP

(57) ABSTRACT

A vehicle image processing device includes a camera that images surroundings of a vehicle and outputs video data. An image extraction unit extracts an image from the video data when a predetermined operation for instructing image acquisition is performed, and an image processing unit processes the extracted image in accordance with a field of view of the user in a vehicle interior. A display processing unit and a display device display the processed image on a screen arranged at a position aligned with a line of sight of the user.

12 Claims, 3 Drawing Sheets

(56) References Cited

U.S. PATENT DOCUMENTS

| | | | |
|---|---|---|---|
| 11,479,177 B2* | 10/2022 | Oba | B60R 1/00 |
| 2007/0072154 A1* | 3/2007 | Akatsuka | G09B 9/04 |
| | | | 434/69 |
| 2008/0239527 A1* | 10/2008 | Okabe | B60Q 9/008 |
| | | | 359/843 |
| 2009/0271732 A1* | 10/2009 | Kondo | G02B 27/0093 |
| | | | 715/781 |
| 2014/0204193 A1* | 7/2014 | Zhang | G06V 40/18 |
| | | | 348/78 |
| 2015/0010207 A1* | 1/2015 | Inada | G06F 3/012 |
| | | | 382/103 |
| 2016/0185293 A1* | 6/2016 | Gieseke | B60R 1/00 |
| | | | 348/115 |
| 2018/0198981 A1* | 7/2018 | Li | H04N 21/4316 |
| 2018/0309962 A1* | 10/2018 | Shimizu | B60R 1/00 |
| 2019/0100157 A1* | 4/2019 | Wang | B60R 1/00 |
| 2019/0263321 A1* | 8/2019 | Gieseke | B60R 1/00 |
| 2021/0291853 A1* | 9/2021 | Hamaguchi | B60W 50/14 |
| 2023/0012629 A1* | 1/2023 | Shin | H04N 5/2628 |

FOREIGN PATENT DOCUMENTS

| | | | | |
|---|---|---|---|---|
| DE | 11 2013 001472 | | 12/2014 | |
| DE | 102013214369 B4 | * | 3/2021 | ............... B60R 1/00 |
| EP | 1 974 998 | | 10/2008 | |
| EP | 1974998 A1 | * | 10/2008 | ............ B60Q 9/008 |
| EP | 2 112 547 | | 10/2009 | |
| EP | 2112547 A2 | * | 10/2009 | ......... G02B 27/0093 |
| EP | 3882079 A1 | * | 9/2021 | ............... B60R 1/00 |
| JP | H06 251287 | | 9/1994 | |
| JP | 2007-96638 | | 4/2007 | |
| JP | 2007096638 A | * | 4/2007 | ............. G09B 19/16 |
| JP | 2010134878 A | * | 6/2010 | ............... B60R 1/00 |
| JP | 4876118 B2 | * | 2/2012 | ............... B60R 1/00 |
| JP | 2021150871 A | * | 9/2021 | ............... B60R 1/00 |
| WO | WO-2010067770 A1 | * | 6/2010 | ............... B60R 1/00 |
| WO | WO-2013136740 A1 | * | 9/2013 | ............. B60K 35/00 |
| WO | WO 2013/161028 | | 10/2013 | |
| WO | WO-2013161028 A1 | * | 10/2013 | ............... B60R 1/00 |
| WO | WO 2017/177716 | | 10/2017 | |
| WO | WO-2018047400 A1 | * | 3/2018 | ............... B60R 1/00 |

* cited by examiner

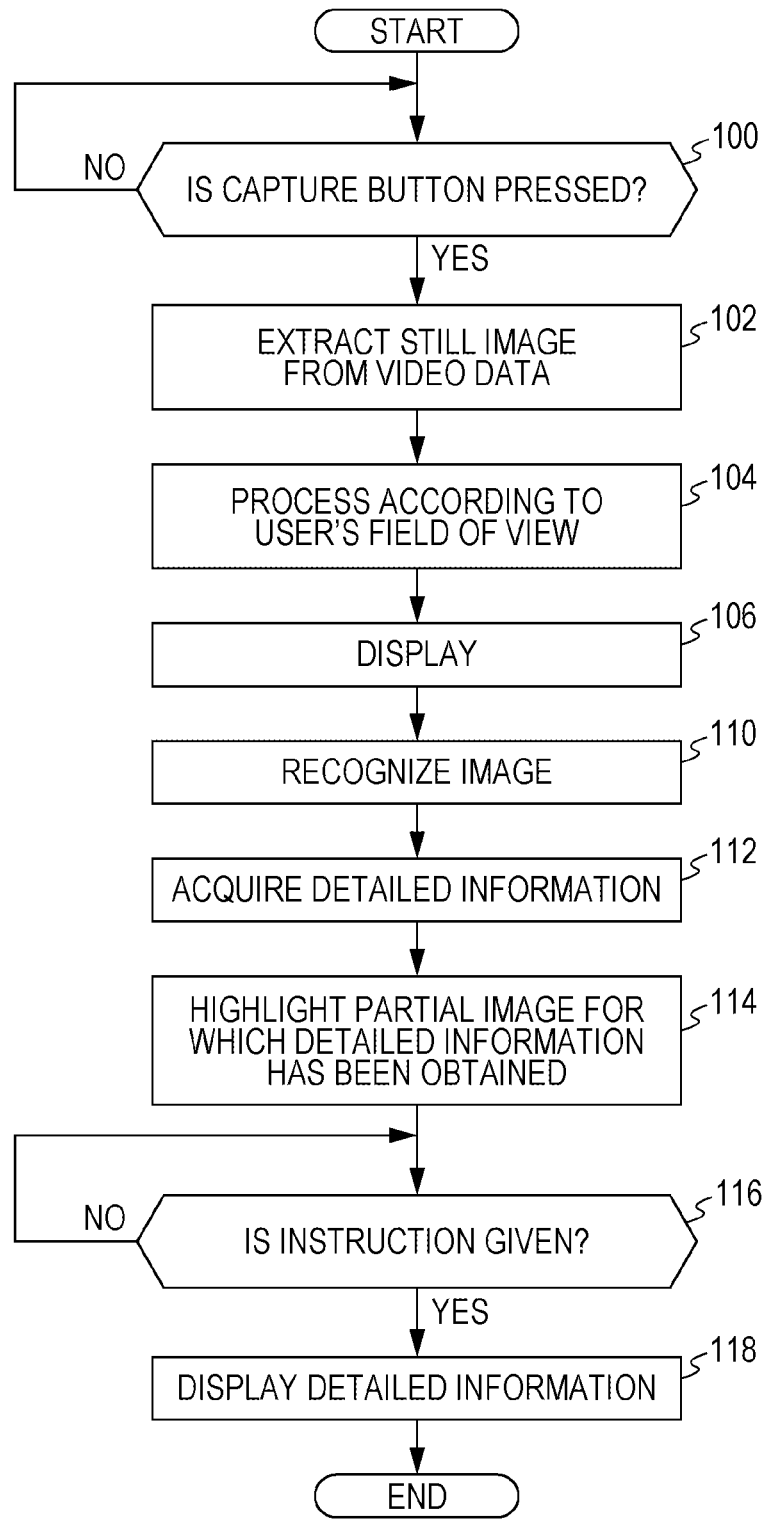

VEHICLE IMAGE PROCESSING DEVICE

RELATED APPLICATION

The present application claims priority to Japanese Patent Application Number 2020-050335, filed Mar. 20, 2020, the entirety of which is hereby incorporated by reference.

BACKGROUND

1. Field of the Invention

The present invention relates to a vehicle image processing device that images and displays the surrounding scenery visible from a vehicle interior.

2. Description of the Related Art

Conventionally, there is known a vehicle ambient video providing device that converts a video captured by an image pickup device into coordinates based on acquired position information on a viewpoint and information on a setting state of a liquid crystal display such that the same video as a case where a vehicle exterior is viewed through an installation area of the liquid crystal display from a position of a driver's viewpoint is displayed on the liquid crystal display (see, for example, Patent Literature 1: JP 2007-96638 A). When this vehicle ambient video providing device is used, it is possible to display a video corresponding to the scenery, which is supposed to be visible in a line-of-sight direction of the driver, on the liquid crystal display.

In the above-described vehicle ambient video providing device disclosed in Patent Literature 1: JP 2007-96638 A, only the video captured by the image pickup device is displayed on the liquid crystal display. Thus, when a vehicle is moving, the content of the video changes from moment to moment, which causes a problem that it is not easy to grasp the content. In particular, an object closer to the vehicle stays within a display range for a shorter period of time, and the object disappears immediately even if the driver or the like tries to confirm the object, so that it is difficult to confirm the object within the display range.

The present invention has been made in view of these points, and an object of the present disclosure is to provide a vehicle image processing device capable of confirming an object included in a range visible to a user.

SUMMARY

In order to solve the above-described problems, a vehicle image processing device of the present disclosure includes: an imaging unit configured to image surroundings of a vehicle and output video data; an image extraction unit configured to extract an image from the video data when a predetermined operation for instructing image acquisition is performed; an image processing unit configured to process the image extracted by the image extraction unit in accordance with a field of view of a user in a vehicle interior; and an image display unit configured to display the image processed by the image processing unit on a screen arranged at a position aligned with a line of sight of the user. As a predetermined operation is performed when an object that the user desires to confirm enters the field of view, an image including this object can be displayed at the position aligned with the line of sight of the user, and thus, it becomes easy to confirm the object included in a range visible to the user.

In addition, it is desirable that a video data storage unit configured to store the video data obtained by imaging of the above-described imaging unit for a predetermined time be further provided, and that the image extraction unit extract an image from the video data stored by the video data storage unit. Since the video data is stored to perform the extraction of the image, it is possible to avoid a situation where an object to be confirmed is not imaged in time.

In addition, it is desirable that the above-described image extraction unit change a timing of extracting an image from the video data based on a traveling speed of the vehicle. As a result, it is possible to prevent the object to be confirmed from being out of an imaging range due to the delay in operation of the user.

In addition, it is desirable that the above-described image extraction unit change a timing of extracting an image from the video data based on an instruction of the user. As a result, it is possible to retroactively confirm the object entering the field of view.

In addition, it is desirable that a line-of-sight detection unit configured to detect the line of sight of the user be further provided, and that the image processing unit generate an image corresponding to the field of view of the user based on the line of sight detected by the line-of-sight detection unit. Since the image is extracted, processed, and displayed in accordance with a direction in which the user is facing, it is possible to reproduce the image in a range actually visible that is included in the user's field of view.

In addition, it is desirable that an image recognition unit configured to perform image recognition on the image displayed by the above-described image display unit and extract a partial image included in the image and an information acquisition unit configured to acquire information on the partial image extracted by the image recognition unit be further provided, and that the image display unit display the information acquired by the information acquisition unit on the screen in association with the partial image. As a result, it is possible to acquire information on the object included in the user's field of view without performing a complicated operation.

In addition, it is desirable that the above-described image display unit display the partial image for which the information has been acquired by the information acquisition unit in a distinguishable form, and display the information acquired by the information acquisition unit regarding the partial image for which the display of the information has been instructed by the user. As a result, it is possible to promptly display information that the user desires to view while preventing deterioration in visibility due to too much information within the screen.

BRIEF DESCRIPTION OF THE DRAWINGS

FIG. 3 is a flowchart illustrating an operation procedure of a modification in which image recognition is performed on an image displayed on a window of a vehicle.

DETAILED DESCRIPTION OF THE PREFERRED EMBODIMENTS

Hereinafter, a vehicle image processing device according to an embodiment of the present invention will be described with reference to the drawings.

Figure 1:
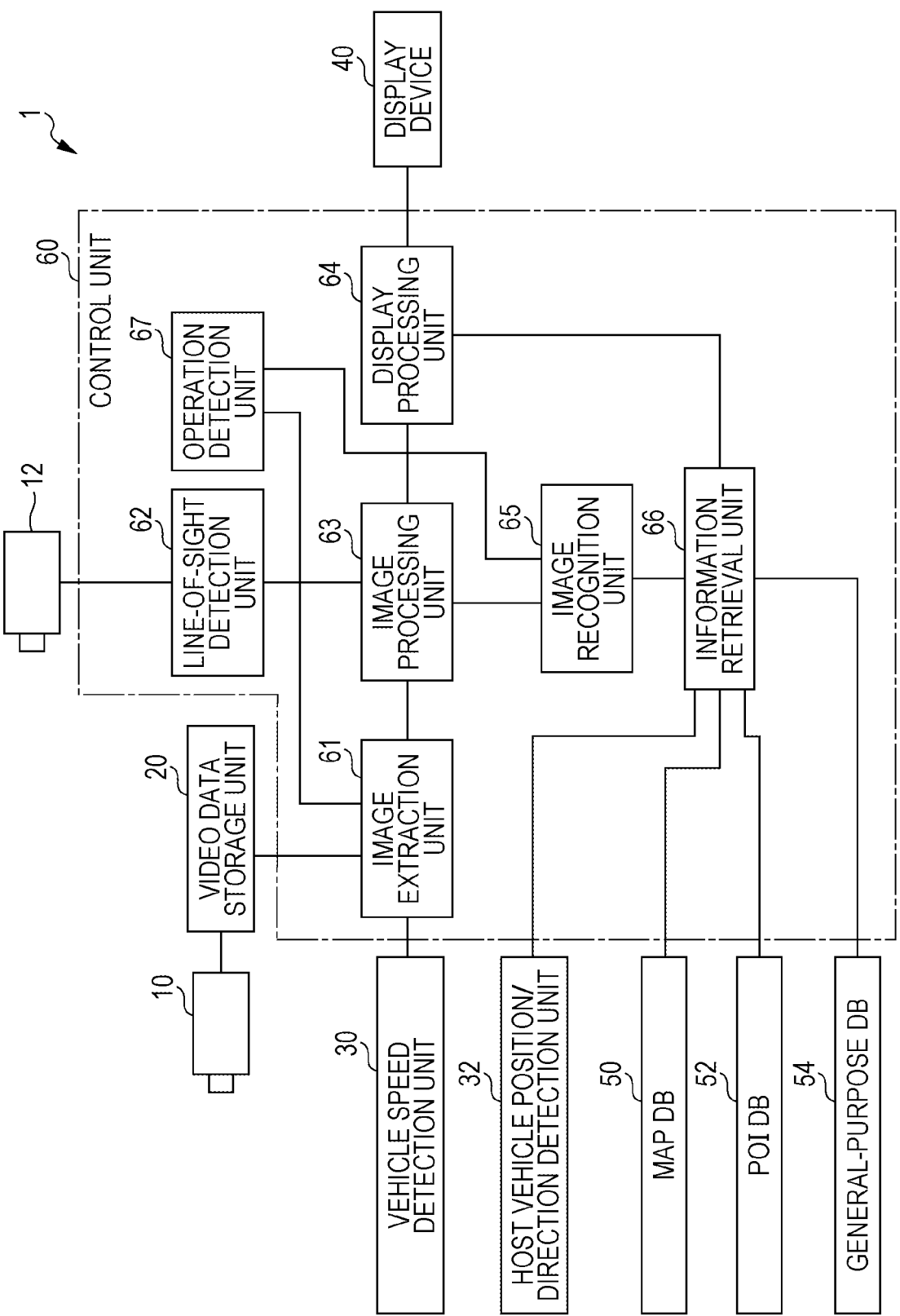
FIG. 1 is a diagram illustrating a configuration of a vehicle image processing device according to an embodiment.

FIG. 1 is a diagram illustrating a configuration of the vehicle image processing device according to the embodiment. A vehicle image processing device 1 of the present embodiment illustrated in FIG. 1 displays an image, similar to, for example, the scenery viewed through a window by a passenger on a rear seat of a vehicle, on this window, and stops the display of the image (moving image) if necessary and provides information on an object (building or the like) as each display element included in this image. For this purpose, the vehicle image processing device 1 includes cameras 10 and 12, video data storage unit 20, vehicle speed detection unit 30, a host vehicle position/direction detection unit 32, a display device 40, a map database (DB) 50, a POI DB 52, a general-purpose DB 54, and a control unit 60.

The camera 10 images the surroundings of the vehicle and outputs video data (moving image). For example, the camera 10 is attached to a right side surface of the vehicle and images a wide range of scenery spreading to the right side of the vehicle. The camera 12 is installed in a vehicle interior and images a face of a user.

The video data storage unit 20 records the video data output from the camera 10 for a predetermined time. The latest video data for the predetermined time is recorded in the video data storage unit 20, and the previous video data is erased (overwritten).

The vehicle speed detection unit 30 detects a speed (vehicle speed) of the vehicle.

The host vehicle position/direction detection unit 32 detects a position and a direction of the vehicle. As a detection method, it is possible to use a GPS receiver, an autonomous navigation sensor, or a combination of these.

The display device 40 displays an image (moving image or still image) on the window of the rear seat (window of a rear door). For example, the display device 40 is implemented by projecting an image on a window glass with variable transparency, which is called a smart window, or by using a transparent organic EL display or a transparent inorganic EL display.

The map DB 50 stores map data such as roads and surrounding terrain thereof, and locations of facilities.

The POI DB 52 stores detailed information on facilities as points of interest (POIs) and natural objects (mountains and the like). This POI DB 52 may be included in the map DB 50.

The general-purpose DB 54 stores detailed information on various objects included in the user's field of view. For example, information on each object other than (or duplicated with) the facilities and the natural objects stored in the POI DB 52 is included. Each object includes a wide range of material objects other than POIs whose information has been stored in the POI DB 52. This general-purpose DB 54 may be included in the POI DB 52.

The control unit 60 controls the entire vehicle image processing device 1, and performs an operation of displaying an image captured by the camera 10 on the display device 40 and displaying information on POIs and various objects included in the image. For this purpose, the control unit 60 includes an image extraction unit 61, a line-of-sight detection unit 62, an image processing unit 63, a display processing unit 64, an image recognition unit 65, an information retrieval unit 66, and an operation detection unit 67. The control unit 60 can implement these various functions by executing a predetermined operation program using a CPU, a ROM, a RAM, and the like.

The image extraction unit 61 extracts an image from the video data stored in the video data storage unit 20 when a predetermined operation (described later) is performed by the user.

The line-of-sight detection unit 62 detects a position of user's eyes and a viewing direction (a position of a viewpoint and a direction of a line of sight) based on a face image of the user captured by the camera 12.

The image processing unit 63 processes the image extracted by the image extraction unit 61 in accordance with the user's field of view. Specifically, the image processing unit 63 performs viewpoint conversion on the image extracted by the image extraction unit 61 to generate an image corresponding to the scenery that the user can view through the screen of the display device 40.

The display processing unit 64 displays the image generated by the image processing unit 63 on the screen (screen of the display device 40) arranged at a position aligned with the line of sight of the user.

The image recognition unit 65 performs image recognition on the image displayed on the screen of the display device 40 generated by the image processing unit 63, and extracts a partial image included in this image.

The information retrieval unit 66 uses the map DB 50, the POI DB 52, and the general-purpose DB 54 to retrieve and acquire detailed information on an object corresponding to the partial image extracted by the image recognition of the image recognition unit 65. Note that this retrieval may be performed by making a request to an external search server connected via the Internet.

The operation detection unit 67 detects an operation performed by the user. For example, it is possible to consider a case where the screen of the display device 40 is included in an imaging range of the camera 12 to detect an operation of pressing an operation button on the screen by the user and a case where a transparent touch panel is arranged on the screen of the display device 40 to detect the operation of pressing the operation button on the screen.

The above-described camera 10 corresponds to an imaging unit, the image extraction unit 61 corresponds to an image extraction unit, the image processing unit 63 corresponds to an image processing unit, the display processing unit 64 and the display device 40 correspond to an image display unit, the video data storage unit 20 corresponds to a video data storage unit, the camera 12 and the line-of-sight detection unit 62 correspond to a line-of-sight detection unit, the image recognition unit 65 corresponds to an image recognition unit, and the information retrieval unit 66 corresponds to an information acquisition unit.

The vehicle image processing device 1 according to the present embodiment has the above configuration. Next, the operation thereof will be described.

Figure 2:
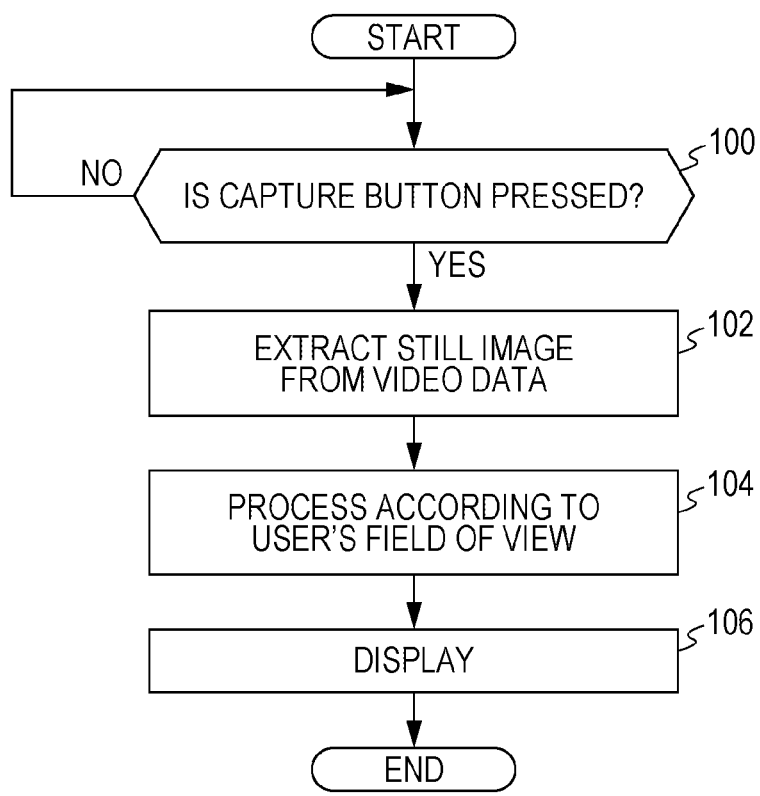
FIG. 2 is a flowchart illustrating an operation procedure for displaying an image, similar to the scenery visible to a user through a window of a vehicle, on the window.

FIG. 2 is a flowchart illustrating an operation procedure for displaying an image, similar to the scenery visible to the user through a window of a vehicle, on the window. In parallel with this operation procedure, an operation of storing the video data obtained by imaging of the camera 10 in the video data storage unit 20 is performed.

The image extraction unit 61 determines whether the user has performed a predetermined operation of instructing acquisition and display of an image, for example, whether a "Capture" button displayed on a part of the screen using the window glass is pressed by the user's finger (touched by the user's finger) (Step 100). When the "Capture" button is not pressed, a negative determination is made, and this determination is repeatedly performed.

When the "Capture" button is pressed, an affirmative determination is made in the determination in Step 100. Next, the image extraction unit 61 extracts an image corresponding to a timing when the "Capture" button has been pressed from the video data stored in the video data storage unit 20 (Step 102). There is a time lag between recognition of the scenery of interest by the user having viewed the outside scenery through the vehicle window and pressing of the "Capture" button. The image extraction unit 61 determines one image to be extracted from the video data in consideration of this time lag and the vehicle speed at that time.

Next, the image processing unit 63 performs viewpoint conversion or the like on the extracted image and processes the converted image in accordance with the user's field of view (Step 104). The display processing unit 64 displays the processed image on the screen (window glass) of the display device 40 (Step 106). It is possible to reproduce the scenery that has been viewed at the location the vehicle has passed in an instant as the vehicle travels by viewing the image displayed in this manner, and thus, the user can confirm various objects and the like entering the field of view at that time.

In this manner, in the vehicle image processing device 1 of the present embodiment, the predetermined operation (pressing of the "Capture" button) is performed when an object that the user desires to confirm enters the field of view, and an image including this object can be displayed at the position aligned with the line of sight of the user. Thus, it becomes easy to confirm the object included in a range visible to the user. In particular, the captured video data is stored, and then, the extraction of the image is performed, so that it is possible to avoid a situation where an object to be confirmed is not imaged in time. In addition, the timing of extracting an image from the video data is changed based on a traveling speed of the vehicle, so that it is possible to prevent the object to be confirmed from being out of the imaging range due to the delay in operation of the user.

In addition, the line-of-sight detection unit 62 detects the viewpoint position and the direction of the line of sight, and the image is extracted, processed, and displayed in accordance with a direction in which the user is facing. Thus, it is possible to reliably reproduce the image in the range actually visible that is included in the user's field of view.

FIG. 3 is a flowchart illustrating an operation procedure of a modification in which image recognition is performed on an image displayed on a window of a vehicle. The operation procedure illustrated in FIG. 3 is different from the operation procedure illustrated in FIG. 2 in terms that Steps 110, 112, 114, 116, and 118 are added next to Step 106. Each of these added steps will be described hereinafter.

After the processed screen is displayed (Step 106) (or in parallel to or prior to the display operation), the image recognition unit 65 performs image recognition on the displayed image, and extracts partial images corresponding to a POI and various other objects included in this image (Step 110).

In addition, the information retrieval unit 66 acquires detailed information of objects corresponding to the partial images extracted by the image recognition using the map DB 50, the POI DB 52, and the general-purpose DB 54 (Step 112).

Next, the information retrieval unit 66 sends an instruction for highlighting the partial images for which the detailed information has been obtained to the display processing unit 64 to highlight these partial images (Step 114). For example, the corresponding partial images are displayed in a form that can be distinguished from others by highlighting or by adding a special color.

Next, the information retrieval unit 66 determines whether any of these highlighted partial images has been instructed by the user (Step 116). When no instruction operation is performed by the user, a negative determination is made, and this determination is repeatedly performed.

In addition, when any of the highlighted partial images is instructed by the user, an affirmative determination is made in the determination in Step 116. The information retrieval unit 66 displays detailed information corresponding to the instructed partial image (Step 118). For example, a window containing a detailed description is displayed at an adjacent position of this partial image.

Since the detailed information on the partial image extracted by the image recognition is displayed in this manner, it is possible to acquire information on an object included in the user's field of view without performing a complicated operation. In addition, the partial image for which the detailed information has been acquired is displayed in a distinguishable form, and the detailed information is displayed when the user instructs the display of the information. Thus, it is possible to promptly display the information that the user desires to view while preventing deterioration in visibility due to too much information within the screen.

Note that the present invention is not limited to the above-described embodiment. For example, the timing of extracting the image from the video data is determined according to the vehicle speed or the like in the above-described embodiment, but may be changed based on an instruction of the user. There is individual difference in time between recognition of the scenery of interest and pressing of the "Capture" button depending on users, and thus, the practicality can be further enhanced if a deviation of the image extraction timing caused by this individual difference can be adjusted. For example, when the processed image is displayed in Step 106 illustrated in FIG. 2, a button that shifts the timing of extracting the image the from video data back and forth in units of seconds is displayed along with this display, and the operations in Steps 104 and 106 are repeated by shifting the image extraction timing back and forth in accordance with the number of pressing operations when this button is pressed by the user. As a result, it is possible to reliably confirm the object entering the field of view in a retroactive manner.

In addition, the corresponding image is displayed by pressing the "Capture" button first in the above-described embodiment, but an instruction may be given with voice, instead of this pressing operation. For example, it is possible to consider a case where "capture" uttered by the user is determined by voice recognition processing and extraction of an image is performed.

In addition, the viewpoint position and the direction of the field of view of the user are detected from the user's face image captured by the camera 12, and image processing such as the viewpoint conversion is performed by the image processing unit 63 in the above-described embodiment. However, image processing may be performed using fixed viewpoint position and line-of-sight direction assuming that the user sits at a predetermined position and views the outside scenery through the window glass.

As described above, according to the present invention, as a predetermined operation is performed when an object that the user desires to confirm enters the field of view, an image including this object can be displayed at the position aligned with the line of sight of the user. Thus, it becomes easy to confirm the object included in a range visible to the user.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle image processing device comprising:
   an imaging unit configured to image surroundings of a vehicle and output video data;
   an image extraction unit configured to extract an image from the video data when a predetermined operation for instructing image acquisition is performed by a user;
   a line-of-sight detection unit configured to detect the line of sight of the user;
   an image processing unit configured to process the image extracted by the image extraction unit in accordance with a field of view of a user in a vehicle interior; wherein the image processing unit generates an image corresponding to the field of view of the user based on the line of sight detected by the line-of-sight detection unit; and
   an image display unit configured to display the image processed by the image processing unit on a screen arranged at a position aligned with a line of sight of the user based on the line of sight detected by the line-of-sight detection unit.

2. The vehicle image processing device according to claim 1, further comprising
   a video data storage unit configured to store the video data obtained by imaging of the imaging unit for a predetermined time, wherein
   the image extraction unit extracts an image from the video data stored by the video data storage unit.

3. The vehicle image processing device according to claim 2, wherein
   the image extraction unit changes a timing of extracting an image from the video data based on a traveling speed of the vehicle.

4. The vehicle image processing device according to claim 2, wherein
   the image extraction unit changes a timing of extracting an image from the video data based on an instruction of the user.

5. The vehicle image processing device according to claim 1, further comprising:
   an image recognition unit configured to perform image recognition on the image displayed by the image display unit and extract a partial image included in the image; and
   an information acquisition unit configured to acquire information on the partial image extracted by the image recognition unit, wherein
   the image display unit displays the information acquired by the information acquisition unit on the screen in association with the partial image.

6. The vehicle image processing device according to claim 5, wherein
   the image display unit displays the partial image for which the information has been acquired by the information acquisition unit in a distinguishable form, and displays the information acquired by the information acquisition unit regarding the partial image for which the display of the information has been instructed by the user.

7. The vehicle image processing device according to claim 2, further comprising:
   an image recognition unit configured to perform image recognition on the image displayed by the image display unit and extract a partial image included in the image; and
   an information acquisition unit configured to acquire information on the partial image extracted by the image recognition unit, wherein
   the image display unit displays the information acquired by the information acquisition unit on the screen in association with the partial image.

8. The vehicle image processing device according to claim 3, further comprising:
   an image recognition unit configured to perform image recognition on the image displayed by the image display unit and extract a partial image included in the image; and
   an information acquisition unit configured to acquire information on the partial image extracted by the image recognition unit, wherein
   the image display unit displays the information acquired by the information acquisition unit on the screen in association with the partial image.

9. A vehicle image processing device comprising:
   an imaging unit configured to image surroundings of a vehicle and output video data;
   a video data storage unit configured to store the video data obtained by imaging of the imaging unit for a predetermined time;
   an image extraction unit configured to extract an image from the stored video data when a predetermined operation for instructing image acquisition is performed by a user;
   a line-of-sight detection unit configured to detect the line of sight of the user;
   an image processing unit configured to process the image extracted by the image extraction unit in accordance with a field of view of a user in a vehicle interior, wherein the image processing unit generates an image corresponding to the field of view of the user based on the line of sight detected by the line-of-sight detection unit;
   an image display unit configured to display the image processed by the image processing unit on a screen;
   an image recognition unit configured to perform image recognition on the image displayed by the image display unit and extract a partial image included in the image; and
   an information acquisition unit configured to acquire information on the partial image extracted by the image recognition unit, wherein the image display unit displays the information acquired by the information acquisition unit on the screen in association with the partial image.

10. The vehicle image processing device according to claim 9, wherein
    the image extraction unit changes a timing of extracting an image from the video data based on a traveling speed of the vehicle.

11. The vehicle image processing device according to claim 9, wherein
the image extraction unit changes a timing of extracting an image from the video data based on an instruction of the user.

12. The vehicle image processing device according to claim 9, wherein
the image display unit displays the partial image for which the information has been acquired by the information acquisition unit in a distinguishable form, and displays the information acquired by the information acquisition unit regarding the partial image for which the display of the information has been instructed by the user.

\* \* \* \* \*